C. W. BRYANT.
PNEUMATIC BRAKE AND CLUTCH CONTROLLER FOR AUTOMOBILES.
APPLICATION FILED SEPT. 6, 1918.

1,297,999.

Patented Mar. 25, 1919.

Witnesses

Inventor
Corwin W. Bryant
By
Attorney

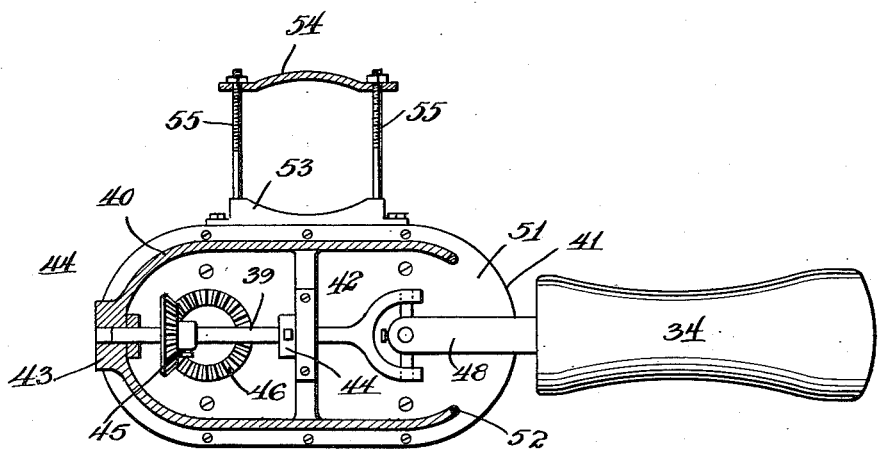
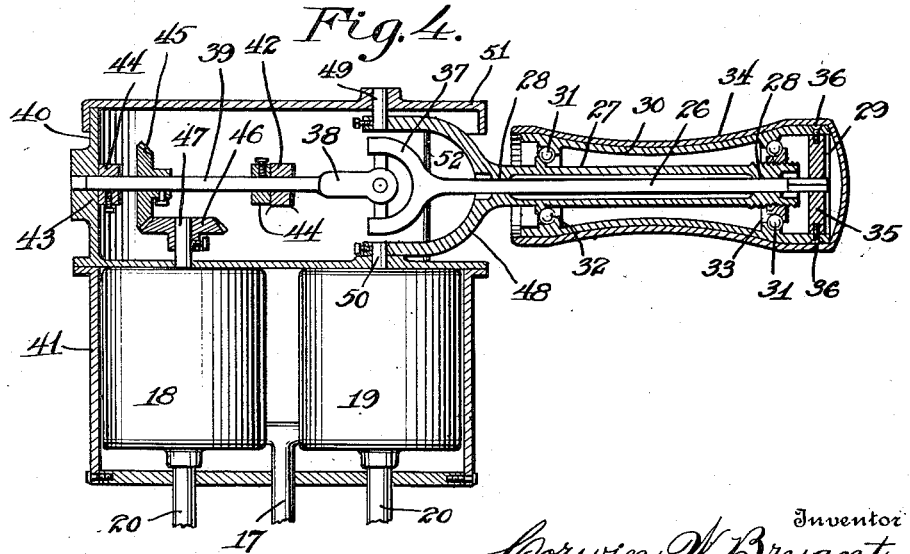

UNITED STATES PATENT OFFICE.

CORWIN W. BRYANT, OF MINNEAPOLIS, MINNESOTA.

PNEUMATIC BRAKE AND CLUTCH CONTROLLER FOR AUTOMOBILES.

1,297,999.     Specification of Letters Patent.     Patented Mar. 25, 1919.

Application filed September 6, 1918. Serial No. 252,927.

*To all whom it may concern:*

Be it known that I, CORWIN W. BRYANT, a citizen of the United States, residing at Minneapolis, in the county of Hennepin and State of Minnesota, have invented certain new and useful Improvements in Pneumatic Brake and Clutch Controllers for Automobiles, of which the following is a specification.

This invention relates to a controller for the brake and clutch mechanisms of powered vehicles, and more particularly relates to a controller adapted to be interposed upon the pneumatic operating system for such mechanisms.

As a principal object, this invention contemplates the provision of a control system for the brake and clutch mechanisms which will so simplify the control of the vehicle as to obviate the expenditure of any such manual effort as is sometimes demanded over long periods of time from the operator of the vehicle in maintaining the actuating pedal for the clutch mechanism in a depressed position, and as to obviate the sudden and forcible pressure necessary to bring the car to a quick stop in cases of emergency.

More specifically, this invention provides a pneumatic system for the operation of the brake and clutch mechanisms of an automobile, together with a controlling member capable of rotational movement in two planes for the separate or simultaneous operation of the respective mechanisms, through the medium of said system.

A further object is to provide a piston for operating each of the brake and clutch mechanisms and to control movement of the pistons by manipulation of individual valves, a grip being provided which may be swung in one plane of rotation for operation of one of the valves and which may be twisted in a plane of rotation at right angles to the first mentioned plane for the control of the other of the valves either separately or simultaneously.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:—

Fig. 3 is a transverse sectional view taken through the controller casing, and

Fig. 4 is a vertical sectional view taken through such casing and the controller itself.

Figure 1:
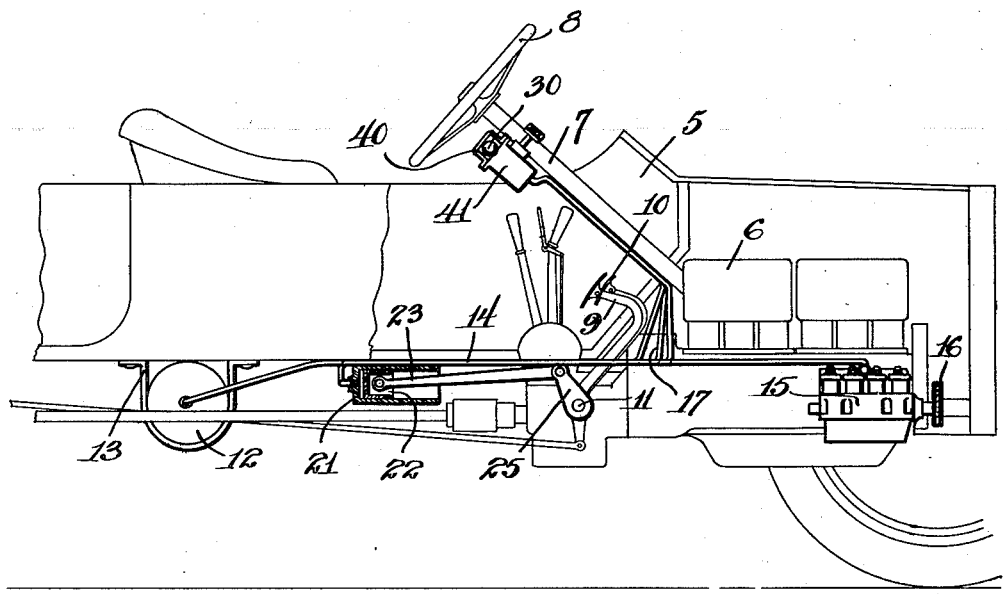
Figure 1 is a view illustrating the application of the system of this invention to an automobile, parts of the latter being broken away for a better illustration of the former.
Figure 2:
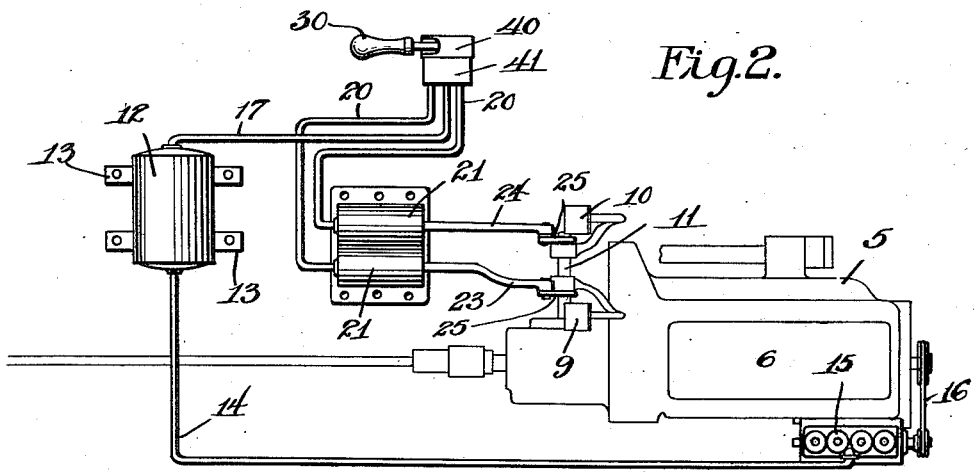
Fig. 2 is a view diagrammatically showing the system as a whole when associated with the mechanisms to be operated thereby.

In taking up the description of this invention according to the embodiment illustrated, reference will first be had to Figs. 1 and 2 in which is shown the system as a whole. In the automobile designated generally by the numeral 5, 6 designates the internal combustion engine for the propulsion thereof. Mounted upon the steering column 7 is the usual steering wheel 8 while foot pedals 9 and 10 mounted upon their respective rock shafts 11 are adapted to control the brake and the clutch mechanisms respectively. This is the usual construction of an automobile and forms no part of the present invention except as the latter may be readily applied thereto without alteration of the parts now in existence. The system of this invention includes a storage tank 12 which may be fastened to some appropriate portion of the vehicle through the medium of hangers 13, serving as the receptacle for the operating fluid of the system. This tank may be connected by pipe or tubing 14 to an air pump 15 which is preferably of some standard make and may readily be driven through the medium of the driving connections 16 when being operated to store air in the tank 12. An outlet pipe 17 supplies the operating fluid to the brake and clutch operating valves 18 and 19 (Fig. 4) while each valve is connected by the conducting pipe 20 with a cylinder 21 in which a piston 22 is movable. Connecting rods 23 and 24 connect respective pistons 22 to the respective brake and clutch rock shafts 11 through the medium of crank arms 25.

The controller of this invention governs the action of the valves 18 and 19 through the employment of the respective shafts 26 and 27. The latter shaft is formed with a central longitudinal bore for the reception of the former, such bore being reduced at the points denoted 28 for the formation of suitable bearing surfaces for the shaft 26, the extremity of which terminates in the squared portion 29. An operating handle for both of the shafts is formed to surround the shaft 27, such handle being designated 30, and spaced from the mentioned shaft through the medium of antifriction bearing balls 31 which are received within raceways 32 and 33 integrally and adjustably carried by the shaft 27 respectively. A rubber grip 34 is carried by the handle 30 and the open end of the latter is fitted with a cap 35, removable through the medium of screws 36 and accommodating the squared extremity 29 of the central valve shaft 26.

This valve shaft 26 is formed at its inner extremity with the yoke 37 making universal joint connections with the similar yoke 38 carried by the shaft 39 within the casing 40 surmounting the valve casing 41. A split bearing 42 and an integral bearing portion 43 carried by the casing 40 serve to support this shaft 39 while set collars 44 prevent displacement of this shaft from its predetermined centered position. Intermediate of its supported extremities, the shaft 39 carries the beveled gear 45 adapted to mesh with the similar gear 46 which is carried in like manner by the stem 47 of the valve 18, so that rotation of the shaft 39 may readily control the operation of this brake valve.

Similarly to the shaft 26 the shaft 27 is formed with a yoke extremity 48, one extremity of which is adjustably supported upon the bearing trunnion 49 while the other connects directly with the valve stem 50 of the clutch operating valve 19. The casing 40 is provided with a cut out portion 51 permitting swinging movement of the handle 30 on the trunnion 49 and the valve stem 50 as a pivot, the edges of such cut out portion being provided with the rubber bumpers 52. Secured to the valve casing 41 is a mounting bracket for the controller and its adjuncts, such bracket including the fixed plate 53 and the adjustable plate 54 which are connected by the threaded bolts 55 in order to position the controller readily upon the steering column 7 of the automobile, handily adjacent to the steering wheel 8.

The structure disclosed in the foregoing provides a controller and a pneumatic system for the operation of the brake and clutch mechanisms of an automobile. Swinging the handle 30 about the pivot points 49—50 will operate directly the valve stem of the clutch valve 19 admitting air from the tank 12 through the pipe 17 and the valve to the piston cylinder 21 for the operation of the lever 24. It will be seen that this movement does not interfere with the ordinary manual control of the clutch mechanism through its pedal 10. If the handle 30 is twisted instead of swung the shaft 39 will be rotated through the medium of the cap 35, the squared extremity of the shaft 26 and the universal joint connections, for the actuation of the beveled gears 45 and 46 and consequent operation of the brake valve stem. It will thus be seen that by a combination of rotational movement and twist of the handle 30 control of the brake and clutch mechanisms of the car is simply and positively assured.

While in the foregoing, however, there has thus been illustrated in the drawings and described in the specification such combination and arrangement of elements as constitute the preferred embodiment of this invention, it will be apparent that this invention may be reduced to practice in any manner determined by the scope of the claims.

What is claimed is:—

1. The combination with an automobile, of a pneumatic system for operation of the brake and clutch mechanisms of said automobile, a valve in said system to operate said brake, a valve in said system to operate said clutch, a pair of shafts rotatable in separate planes for the regulation of respective valves, and a single controller for rotation in both planes for the operation of both said shafts.

2. The combination with an automobile, of a pneumatic system for operation of the brake and clutch mechanisms of said automobile, a valve in said system to operate said brake, a valve in said system to operate said clutch, a shaft rotatable in a vertical plane for the regulation of the clutch valve, a shaft rotatable to regulate the brake valve, and a single controller adapted to be horizontally swung or to be twisted in the respective operation of said shafts.

3. The combination with a brake mechanism and a clutch mechanism, of a pneumatic cylinder for each mechanism, a piston movable in each cylinder and connected to the respective mechanism for operation of the latter, a valve governing the inlet to each cylinder, a hollow shaft for operation of one of said valves, a second shaft for the operation of the other of said valves and receivable in said hollow shaft, and means carried by first said shaft for operation of both of said shafts.

4. The combination with a brake mechanism and a clutch mechanism, of a pneumatic cylinder for each mechanism, a piston movable in each cylinder and connected to the respective mechanism for operation of the latter, a valve governing the inlet to each cylinder, a hollow shaft for operation of one of the valves, a second shaft for operation of the other of the valves and receivable in said hollow shaft, and a controller connected to each shaft for operation thereof when respectively swung or twisted.

5. The combination with a brake mechanism and a clutch mechanism, of a pneumatic cylinder for each mechanism, a piston movable in each cylinder and connected to the respective mechanism for operation thereof, a valve governing the inlet to each cylinder, a hollow shaft adapted to be horizontally rotated for operation of one of said valves, a second shaft rotatable within said hollow shaft for operation of the other of the valves, and a controller supported upon said hollow shaft for operation of each shaft when respectively swung or twisted.

6. The combination with a brake mechanism and a clutch mechanism, of a pneumatic cylinder for each mechanism, a piston movable in each cylinder and connected to the respective mechanism for operation thereof, a valve governing the inlet to each cylinder, a hollow shaft adapted to be rotated to operate one of said valves, a rotatable shaft for the operation of the other of said valves, a shaft projecting through said hollow shaft, universal joint connections between second said and third said shafts, and means adapted to be respectively swung and twisted for operation of said hollow shaft and last said shaft.

7. In a valve controlling mechanism, the combination with a pair of separated valves, of a stem for each valve, a hollow shaft connected to one of said valve stems for operation thereof, a second shaft, gear connections between said second shaft and the other valve stem, a third shaft projecting through said hollow shaft, universal joint connections between said second and said third shafts, a controlling handle antifrictionally mounted upon said hollow shaft, and direct connections between said handle and said third shaft, to operate second said valve stem upon a twisting of said handle and to operate first said stem upon a swinging of said handle.

8. In a valve controlling mechanism, the combination with a pair of valves, of a stem for each valve, a hollow shaft formed with a pivoting yoke at one extremity, said yoke being connected to one of said valve stems, a second shaft, driving connections between said second shaft and the other valve stem, a third shaft projecting through said hollow shaft, universal joint connections between said second and said third shafts and receivable within said yoke, a controlling handle surrounding said hollow shaft, antifrictional means supporting said handle, and direct connections between said handle and said third shaft exclusive of said hollow shaft for operation of said valve stems upon a respective swinging and twisting of said handle.

In testimony whereof I affix my signature in presence of two witnesses.

CORWIN W. BRYANT.

Witnesses:
  A. H. Fowle,
  W. P. Whitaker.